United States Patent Office 3,565,942
Patented Feb. 23, 1971

3,565,942
DIALKYLAMINOALKYL ESTERS OF ADAMANTANECARBOXYLIC ACIDS
Carl Peter Krimmel, Wauconda, Ill., assignor to G. D. Searle & Co., Chicago, Ill., a corporation of Delaware
No Drawing. Continuation-in-part of application Ser. No. 466,812, June 24, 1965. This application June 7, 1967, Ser. No. 644,099
Claims priority, application Great Britain, June 13, 1966, 26,187/66
Int. Cl. C07c 93/16
U.S. Cl. 260—468
6 Claims

ABSTRACT OF THE DISCLOSURE

The present dialkylaminoalkyl and related esters of adamantanecarboxylic acids possess anti-inflammatory activity and activity against a variety of organisms. Thus, they are anti-bacterial, anti-protozoal, anti-fungal, and anti-algal agents. The compounds are prepared by the reaction of an adamantanecarboxylic acid with an appropriate dialkylaminoalkyl halide or similar compounds.

SUMMARY OF THE INVENTION

The present application is a continuation-in-part of application Ser. No. 466,812, now abandoned, filed June 25, 1965.

The present invention relates to a group of amino-alkyl esters of adamantanecarboxylic acid and homoadamantanecarboxylic acid. More particularly, it relates to a group of compounds having the following general formula

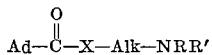

wherein Ad is selected from the group consisting of adamantyl and homoadamantyl with, in each case, the free valance occurring at a bridgehead position; X is selected from the group consisting of O and S; Alk is a lower alkylene radical separating the atoms attached thereto by at least 2 carbon atoms; —NRR' is selected from the group consisting of di(lower alkyl)amino and cyclic amino. Examples of cyclic amino radicals are 1-pyrrolidinyl, piperidino, morpholino, and 4-methyl-1-piperazinyl.

The lower alkylene radicals referred to above contain up to 6 carbon atoms and can be exemplified by radicals such as ethylene, propylene, trimethylene, and tetramethylene. The lower alkyl radicals referred to above likewise contain up to 6 carbon atoms and can be exemplified by radicals such as methyl, ethyl, propyl, isopropyl, and butyl.

The organic bases of this invention form pharmaceutically acceptable salts with a variety of inorganic and strong organic acids. Such salts are formed with acids such as sulfuric, phosphoric, hydrochloric, hydrobromic, hydriodic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzensulfonate, ethyl toluenesulfonate, ethylene chlorohydrin, propylene chlorohydrin, allyl bromide, methallyl bromide, and crotyl bromide.

The compounds of the present invention are prepared by the reaction of an adamantanecarbonyl halide or a homoadamantanecarbonyl halide with an appropriate aminoalkanol or an aminoalkanethiol in the presence of a tertiary base such as pyridine. The acid chloride is preferred for this reaction. The present esters can also be conveniently prepared by the reaction, for example, of adamantane-1-carboxylic acid with an appropriate dialkylaminoalkyl halide in a solvent such as 2-propanol.

The compounds of the present invention are useful because of their pharmacological properties. In particular the present compounds possess anti-inflammatory activity. Thus, they have a phenylbutazone-like effect on edematous conditions. These compounds have also been found to be bradykinin antagonists.

The present compounds also possess anti-biotic activity against a variety of organisms. Thus, they inhibit the growth of bacteria such as Bacillus subtilus, Escherichia coli, and Diplococcus pneumoniae, protoza such as Tetrahymena gelleii, fungi such as Trichophyton mentagrophytes and Candida albicans, and algae such as Chlorella vulgaris. The present compounds can thus be combined with various known excipients and adjuvants in the form of dusts, solutions, suspensions, ointments, and sprays to provide compositions useful for disinfecting purposes.

The present compounds also inhibit germination of seeds of Trifolium.

The following examples are presented to further illustrate the present invention; they should not be construed as limiting it in spirit or in scope. In these examples, quantities by weight are indicated in grams, quantities by volume are indicated in milliliters, and temperatures are indicated in degrees centigrade (° C.).

EXAMPLE 1

To a stirred refluxing solution of 6 grams of adamantane-1-carboxylic acid in 60 ml. of anhydrous 2-propanol there is added 4.5 grams of 2-diethylaminoethyl chloride. The resultant mixture is refluxed for 4 hours and then cooled to room temperature and filtered to remove traces of insoluble solids.

The solvent is evaporated from the filtrate under reduced pressure and the residue is dissolved in dilute hydrochloric acid. The hydrochloric acid solution is filtered to remove acid insoluble solids and it is then treated with activated charcoal and made alkaline by the addition of sodium hydroxide. The alkaline solution is extracted with ether and the ether solution is treated with activated charcoal and dried over anhydrous calcium sulfate. The solvent is evaporated from the ether solution and the residue is distilled to give a clear, colorless oil boiling at about 164–166° C. at 3.5 mm. The product thus obtained is 2-diethylaminoethyl adamantane-1-carboxylate.

3.8 grams of this ester is dissolved in 40 ml. of 2-butanone and mixed with an equivalent of hydrogen chloride in a 2-propanol solution containing 0.23 gram of hydrogen chloride per milliliter of solution. 100 ml. of anhydrous ether is stirred into the resultant white suspension. The mixture is filtered and the separated solid is washed with anhydrous ether and then dried to give 2-diethylaminoethyl adamantane-1-carboxylate hydrochloride melting at about 180–183° C. The free base of this compound has the following formula

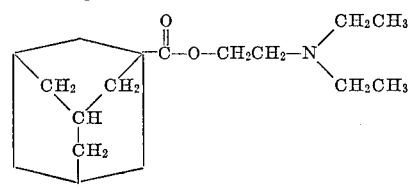

EXAMPLE 2

8.1 grams of adamantane-1-carboxylic acid dissolved in 90 ml. of 2-propanol is reacted with 9.0 grams of 3-diethylaminopropyl chloride according to the procedure described in Example 1. The crude product obtained by evaporation of the 2-propanol solvent is dissolved in 200 ml. of distilled water with vigorous shaking. The resultant aqueous solution is then filtered through decolorizing charcoal and made alkaline by the addition of 10% sodium hydroxide solution. The alkaline solution is extracted with ether and the ether extract is treated with charcoal and then dried over anhydrous calcium sulfate. The solvent is evaporated from the ether solution and the residue is distilled to give a straw-colored oil boiling at about 175–177° C. at 3.0 mm. The product thus obtained is 3-diethylaminopropyl adamantane-1-carboxylate.

A solution of 3.5 grams of this ester in 20 ml. of 2-butanone is mixed with 2.0 ml. of a solution containing 0.23 gram of hydrogen chloride per milliliter of anhydrous 2-propanol. A thick white precipitate forms and the mixture is diluted with 10 ml. of 2-butanone and filtered. The separated solid is washed with 2-butanone and then dried to give 3-diethylaminopropyl adamantane-1-carboxylate hydrochloride melting at about 171–173° C.

EXAMPLE 3

A mixture of 1.8 grams of 3-diethylaminopropyl adamantane-1-carboxylate, 2.6 grams of ethyl bromide, and 10 ml. of 2-butanone is refluxed on a steam bath for 2 hours. The resultant mixture is then allowed to cool and stand at room temperature for 16 hours. The white crystalline precipitate which forms is filtered, washed with anhydrous ether, and dried to give 3-diethylaminopropyl adamantane-1-carboxylate ethobromide melting at about 173–183° C. This compound has the following formula

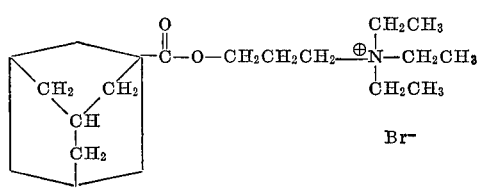

EXAMPLE 4

2-dimethylaminoethyl chloride and 3-dimethylaminopropyl chloride are each reacted with adamantane-1-carboxylic acid according to the procedure described in Example 1 to give, respectively, 2-dimethylaminoethyl adamantane-1-carboxylate and 3-dimethylaminopropyl adamantane-1-carboxylate.

EXAMPLE 5

1(2-chloroethyl)piperidine, 1 - (2-chloroethyl)-pyrrolidine, 4-(2-chloroethyl)morpholine, and 1-(2-chloroethyl)-4-methylpiperazine are each reacted with adamantane-1-carboxylic acid according to the procedure described in Example 1 to give the corresponding ester in each instance.

EXAMPLE 6

A mixture of 4.0 grams of adamantane-1-carboxylic acid and 30 ml. of thionyl chloride is refluxed on a steam bath for 30 minutes. Excess thionyl chloride is removed by distillation at reduced pressure and final traces of thionyl chloride are removed by adding azeotropically dried benzene and resuming vacuum distillation. The residual adamantane-1-carbonyl chloride is then dissolved in 25 ml. of anhydrous pyridine. A suspension of 4.0 grams of 2-dimethylaminoethanethiol hydrochloride in 30 ml. of anhydrous pyridine is added to the acid chloride with stirring. The reaction mixture is then heated on a steam bath for 30 minutes and filtered hot. The filtrate thus obtained is cooled and a white precipitate is formed. This is separated by filtration, suspended in 2-butanone, and filtered again. The resultant solid is then dried to give S - (2-dimethylaminoethyl)adamantane-1-thiocarboxylate as the hydrochloride melting at about 234–252° C. The free base of this compound has the following formula

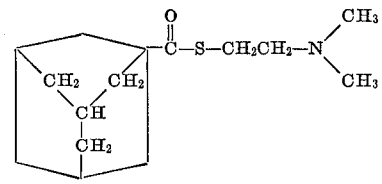

EXAMPLE 7

To a stirred, refluxing solution of 6 grams of homoadamantane-3-carboxylic acid in 60 ml. of anhydrous 2-propanol there is added 4.2 grams of 2-diethylaminoethyl chloride. The resultant mixture is refluxed for 4 hours and then cooled to room temperature and filtered to remove traces of insoluble solid. The filtrate is then heated on a steam bath under reduced pressure to remove the 2-propanol solvent. The resultant residue is then treated with 150 ml. of distilled water and, after vigorous stirring, an equivalent quantity of anhydrous isopropanol-aqueous filtrate is then further diluted with 200 ml. of distilled water and the slight turbidity which develops is removed by filtering the mixture through diatomaceous earth. The clarified filtrate is then made alkaline by the addition of 10% sodium hydroxide solution. An emulsion forms and it is extracted with anhydrous ether. The ether extract is dried over anhydrous calcium sulfate, treated with charcoal, and filtered. The ether solvent is removed from the filtrate by heating it on a steam bath under reduced pressure. The residue is then further distilled to give 2-diethylaminoethyl homoadamantane-3-carboxylate, boiling at about 175–177° C. at 2.5–3.0 mm. pressure.

To a solution of 2.9 grams of the foregoing product dissolved in 30 ml. of 2-butanone there is added, with stirring, an equivalent quantity of anhydrous isopropanoic hydrogen chloride solution. A thick crystalline slurry forms; this precipitate is separated by filtration, washed with 2-butanone, and dried to give 2-diethylaminoethyl homoadamantane-3-carboxylate hydrochloride, melting at about 182–185° C. The addition of 5 mg. of this compound to an agar plate inocculated with *Candida albicans* inhibits the growth of this organism.

What is claimed is:

1. A member selected from the group consisting of compounds of the formula

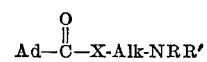

wherein Ad is selected from the group consisting of adamantyl and homoadamantyl; X is O; Alk is lower alkylene separating the atoms attached thereto by at least two carbon atoms; and —NRR' is selected from the group consisting of di(lower alkyl)amino, 1-pyrrolidinyl, piperidino, morpholino, and 4-methyl-1-piperazinyl; and the acid addition and alkyl halide quaternary ammonium salts thereof.

2. A compound according to claim 1 which has the formula

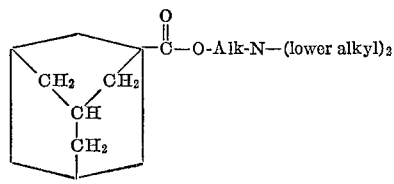

wherein Alk is lower alkylene separating the atoms attached thereto by at least 2 carbon atoms.

3. A compound according to claim 1 which is 2-diethylaminoethyl adamantane-1-carboxylate.

4. A compound according to claim 1 which is 3-diethylaminopropyl adamantane-1-carboxylate.

5. A compound according to claim 1 which is 3-diethylaminopropyl adamantane-1-carboxylate ethobromide.

6. A compound according to claim 1 which is 2-diethylaminoethyl homoadamantane-3-carboxylate.

References Cited

Zh. Organ. Khim 2(9) 1635–8 (1966).
J. Med. Chem. 8(5) 580–3 (1965).
J. Med. Chem. 6, 760 (1963).

LORRAINE A. WEINBERGER, Primary Examiner

P. J. KILLOS, Assistant Examiner

U.S. Cl. X.R.

260—247.2, 268, 294.3, 326.3, 455; 424—305

PO-1050
(5/69)

UNITED STATES PATENT OFFICE
CERTIFICATE OF CORRECTION

Patent No. 3,565,942          Dated February 23, 1971

Inventor(s)          Carl Peter Krimmel

It is certified that error appears in the above-identified patent and that said Letters Patent are hereby corrected as shown below:

Column 1, line 57-58, "hydriodic, citric" should read
-- hydriodic, sulfamic, citric --.

Column 4, line 25, "stirring, an equivalent quantity of anhydrous isopropanol-" should read
-- stirring, it is filtered to remove undissolved material. The --.

Column 4, line 40, "isopropano-" should read -- isopropanol

Signed and sealed this 10th day of August 1971.

(SEAL)
Attest:

EDWARD M. FLETCHER, JR.
Attesting Officer

WILLIAM E. SCHUYLER,
Commissioner of Paten